United States Patent [19]

McAllister, Jr.

[11] 4,274,882

[45] Jun. 23, 1981

[54] FORMULATION CONTAINING TRINIDAD ASPHALT FOR MORE DUCTILE ASPHALTIC CONCRETE PAVEMENTS

[76] Inventor: LeRoy H. McAllister, Jr., R.R. 1, Zionsville, Ind. 46077

[21] Appl. No.: 138,595

[22] Filed: Apr. 9, 1980

Related U.S. Application Data

[63] Continuation-in-part of Ser. No. 974,359, Dec. 29, 1978, abandoned, which is a continuation-in-part of Ser. No. 718,892, Aug. 30, 1976, abandoned.

[51] Int. Cl.$^3$ ............................................ C08L 95/00
[52] U.S. Cl. ................. 106/280; 106/281 R; 106/283
[58] Field of Search .................... 106/281 R, 283, 280

[56] References Cited

U.S. PATENT DOCUMENTS

| 1,057,667 | 4/1913 | Pine et al. ...................... 106/280 X |
|---|---|---|
| 1,672,361 | 6/1928 | Berger ................................ 106/280 |
| 2,171,153 | 8/1939 | Warden .............................. 106/281 |
| 2,917,395 | 12/1959 | Csanyi ......................... 106/280 R X |
| 3,274,016 | 9/1966 | Rogers et al. ..................... 106/281 |
| 3,287,146 | 11/1966 | Rogers et al. ..................... 106/281 |
| 3,902,914 | 9/1975 | Gagle et al. ................... 106/281 X |
| 3,957,525 | 5/1976 | Lees et al. ..................... 106/281 X |

OTHER PUBLICATIONS

The Asphalt Handbook, (The Asphalt Institute, 1962), Jul. 1962.
Highway and Heavy Construction, Apr. 1977, pp. 50–54, McAllister.

*Primary Examiner*—Howard E. Schain
*Attorney, Agent, or Firm*—Robert A. Spray

[57] ABSTRACT

More ductile asphaltic pavement compositions, obtained by use of a certain blended Trinidad asphalt cement and certain aggregate mixtures, all in certain proportions.

17 Claims, No Drawings

FORMULATION CONTAINING TRINIDAD ASPHALT FOR MORE DUCTILE ASPHALTIC CONCRETE PAVEMENTS

This is a Continuation-In-Part of Applicant's Application, Ser. No. 974,359, filed Dec. 29, 1978, which was a continuation-in-part of Applicant's Application Ser. No. 718,892, filed Aug. 30, 1976, both now abandoned.

The present invention relates to asphalt compositions for pavement or other use.

More particularly, the present inventive concepts provide and achieve asphaltic compositions which provide a surface which will remain more ductile, and provide for better and longer useful service-life.

Conventional asphaltic concretes are limited as to useful service-life by a hardening process which occurs increasingly with the passage of time, with even minor changes in the base conditions, together with the usual use conditions of repetitive loads, stresses caused by weather and climate factors, etc.

All of these, and perhaps other factors, with other pavement compositions, sooner or later result in cracking, potholing, and chuckholing conditions which are obviously undesirable, and which incur bothersome and expensive procedures of maintenance and ultimately a necessity of repaving.

Many asphaltic roadways formed from other compositions are thus required to be repetitively resurfaced, at least at 10–15 year intervals, creating a very large and recurring expense which is long postponed or altogether avoided by the compositions of the present invention.

Concepts of the present invention provide specific formulations which will enhance pavement-ductility for at least 20 years, and perhaps indefinitely longer. The enhanced ductility, correspondingly, achieves an extremely high resistance to those objectionable conditions of cracking, potholing, and chuckholing, thereby achieving the desired result of the asphaltic concrete remaining in essentially repairless condition throughout its life.

The concepts of the invention further are of advantage in that they utilize materials which are ordinarily and commonly used. This is in respect to both the asphaltic ingredients of the asphalt cement mix, and also to the aggregate mixtures.

Further, the concepts of the invention achieve this desired long-prolonged ductility, with its corresponding minimization of the disadvantageous progressively-worsening hardness factors of cracking, potholing, and chuckholing, without a sacrifice of other valued pavement characteristics.

The above description is of a generalized and introductory nature. Details of the inventive concepts are now more fully set forth in several specific embodiments.

In accordance with the present invention, the concepts provide that Refined Trinidad asphalt and refinery (petroleum) asphalt are blended, in a proportion of 10%–50% Refined Trinidad asphalt (by weight of the resulting Blended Trinidad Asphalt Cement) with 50%–90% refinery asphalt (by weight of the resulting Blended Trinidad Asphalt Cement).

Then the Blended Trinidad Asphalt Cement, made as mentioned in the above proportions, is mixed in a hot mix process, that is, as considered in this industry, a mixing at a temperature above 212° F. (preferably 280°–330° F.). The proportionate weight percentage of from 4.0% to 8.0% (by weight) of that Cement is mixed with any of the following aggregate mixtures:

| Aggregate Sieve Size (Passing) | Type I | Type II |
|---|---|---|
| Passing ¾" | 100 | |
| Passing ½" | 98–100 | 100 |
| Passing ⅜" | | 98–100 |
| No. 8 (Retained on) | 40–60 | 30–50 |
| Passing 200 mesh | 3–8 | 3–9 |

| Aggregate Sieve Size (Passing) | Type III | Type IV |
|---|---|---|
| Passing ¾" | 100 | |
| Passing ½" | 79–90 | 100 |
| Passing ⅜" | 55–80 | 80–97 |
| No. 8 (Retained on) | 30–45 | 36–48 |
| Passing 200 mesh | 0–3 | 0–3 |

| Aggregate Sieve Size (Passing) | Type V (Fine) | Type VI (Course) |
|---|---|---|
| Passing 1" | | 95–100 |
| Passing ¾" | 100 | |
| Passing ½" | 90–100 | 25–60 |
| Passing ⅜" | 40–70 | |
| No. 8 (Retained on) | 0–5 | 0–5 |
| Passing 200 mesh | 0–8 | 0–8 |

There is substantially no sand in the aggregate, as is seen from the fact that the embodiments show nothing between the amount retained on a No. 8 screen, and the amount passing a 200 mesh screen.

Particular embodiments which seem desirable are the same as shown for Types I, II, III, IV, V, and VI except that for Types I and II the weight percentages of the Cement in the pavement mixture are in the range of 6.0% to 7.5%; and for Type III the Cement (by weight) percentage in the pavement mixture is in the range of 5.5% to 7.0% and for Type IV is 6.0% to 7.0%.

Also, it is desired for Types I and II that the refinery asphalt is one which gives a penetration number (of the cement mixture) 85 to 100; and for Type III and IV one giving a penetration number (of the cement mixture) of 55–85.

Rather than being definitely limited as to this respect, the concepts provide that the asphalts may be chosen so as to yield a penetration number in as wide a range as from 20 to 150, when measured at 77° F.

Similarly, the concepts provide that the weight percentage of the Refined Trinidad Asphalt (as based upon the total Blended Trinidad Asphalt Cement) may be as from 10% to 50%, the percentage weight of the refinery asphalt being correspondingly from 50% to 90%.

PATENTABILITY OVER REFERENCES

In considering the nature and significance of these concepts, it may be considered helpful to realize that the art of asphaltic pavements is quite old, dating back many scores of years; yet everyone is quite aware that many asphaltic pavements do not hold up well for what should hopefully be a useful lengthy term of service years.

The cracking, potholing, and chuckholing have been a problem continually in this industry; and because much of the industrial use of asphaltic compositions of this nature is in the use of roadway pavements, all taxpayers have had to long endure the bother and cost of road repairs and roadway re-paving.

Thus the long-felt need, and the long-known awareness of the great and unsolved problems of the long-life roadway conditions of cracking, potholing, and chuckholing, should all be considered in deciding as to questions of anticipation and obviousness of invention.

1. Berger (U.S. Pat. No. 1,672,361 (1928))

The Berger patent deals with and is restricted to formulation and processes suitable for cold mix pavements, and Berger expressly contrasts his cold mix with a hot mix (p. 3, lines 80–90). The present invention, in contrast, by its nature, must be a hot mix pavement.

A primary distinction of the present invention over Berger is that Berger is dealing wholly with a mastic (p. 3, lines 40–46), quite weak because it contains an excess of binder. Also, Berger refers to only a sheet asphalt, rather than asphaltic concrete of the present invention.

Berger always utilizes light volatile hydrocarbons (p. 3, l. 49 ff.) in order to achieve workability of the pavement mix at cold temperatures. The success of the cold mix process and formulations would be uncertain and somewhat unpredictable as to long-life wearing quality, because it is dependent upon their use. The present invention, in contrast, does not employ volatile material, but attains workability by the temperature of the hot mix process, and is more certain as to quality.

Berger does not ever assert that he utilizes Trinidad in specific formulations to achieve specific improvement in long term pavement performance. Employed in this manner, it probably would not even do so. The Berger patent allows the use of Trinidad as an option in cold mixes to try to achieve proper workability of the mix, that is, workability in the installation process because it is a cold mix process, in contrast to the present invention's hot mix process which utilizes Trinidad in specific proportions thereby gaining the enduring wear quality set forth in this invention.

Further, although this Berger patent mentions the use of a blend of Refined Trinidad Asphalt with Refinery Asphalt, Berger does not mention any specific percentages, and it does not mention nor suggest nor use an asphalt cement made from anything like specifically 10%–50% Trinidad Asphalt with 50%–90% Refinery Asphalt.

Moreover, it is believed that the prevailing practice of the time of Berger (1928) was approximately 50% Trinidad Asphalt and 50% Refinery Reduced Crude, meaning that the non-Trinidad portion was about 15% Refinery Asphalt and 35% lighter hydrocarbons; but with Berger's use of even lighter hydrocarbons and volatile materials as a fluxing or thinning agent to make a more workable pavement mixture, that indicates that Berger and those using Berger's concepts would not likely even want a proportion similar to the 10%–50% Trinidad and 50%–90% Refinery, as here set forth in combination with certain aggregate mixes.

2. Lees et al (U.S. Pat. No. 3,957,525 (1976))

Lee' uses of Trinidad Lake Asphalt are only as an optional use at best; and even then, Lees' aggregate specifications are not that expressly set forth in this invention, and, further, the Lees aggregate specifications (note the title to Lees Table II) are expressly noted by Lees himself as being for rolled asphalt rather than the asphaltic concrete expressly stated as the subject matter of this invention.

As an important distinction over Lees, the present invention uses substantially no sand whereas Lees asserts about 36.4% sand-size particles (Table I, column 3). Thus with that much proportion of such small particles, the Lees composition cannot be considered to be an asphaltic concrete.

Further as to Lees, his text expressly limits his disclosure to a road surface material which has aggregates with different wear rates as an essential factor. (Lees, Col. 1, l .43). This helps show the high significance of the distinctions of the present invention over the Lees disclosure, such as in respect of aggregate nature or size; for Lees' product (according to Lees as cited) is fully workable only if the aggregate includes a differential wear rate of different particles.

The Lees patent thus is concerned with use of aggregates with differential wear rates to achieve a hoped skid resistance; and Lees' reference to the known factor of blending Trinidad Lake Asphalt and Refinery Asphalt is not suggestive of the particulars of this present invention, and Lees suggests no proportions at all for the amount of Trinidad Lake Asphalt.

Moreover, like the Berger patent, the Lees patent does not suggest any specific relative percentages of Trinidad Asphalt to Refinery Asphalt, much less the specific proportion here specified in combination with certain specific aggregate mixtures; and for these many reasons, Lees not only fails to show this invention particulars, but the different basic intent and nature of Lees shows that this invention's particulars are not obvious from the Lees disclosure.

That is, it cannot be over-emphasized that Lees is seeking a different purpose, as now summarized. Lees uses Lake Asphalt (Trinidad) optionally as a binder. Lees does not assert Trinidad to be essential to the use of his method, nor to be used so as to impart any special characteristics, that is, to provide a pavement which will remain resistant to cracking and potholing. All this, coupled with Lees' express need of differential wear rate aggregate, shows a basic distinction between Lees and this invention, and shows that the Lees can not show obviousness of this invention which successfully attains advantages not attained or even sought by Lees.

3. The Asphalt Handbook (The Asphalt Institute, 1962)

This handbook, and its supplementary later editions, is considered a respected and authoritative treatise with respect to Refinery (or petroleum) Asphalt. However, these authoritative treatises do not suggest nor make obvious the present invention, for although they contain many sets of aggregate mixtures, the aggregate mixtures per se are not herein asserted as inventive; and, moreover, they do not even assert any suggestions at all as to the use of any compositions involving any of their aggregate listings with an asphalt cement which includes any Trinidad Asphalt, which is an express concept of this present invention.

Any reference or use of merely refinery or petroleum type asphalt, without Trinidad Lake Asphalt being included, simply is not necessarily directly related to, nor specifically compatible with, or convertible to the latter. The technology in the use of Trinidad Asphalt is considerably different from that of asphalt of the conventional type which is of a refinery or petroleum type but without any Trinidad Lake Asphalt. As an example, Trinidad Lake Asphalt inherently has an adventitious filler (with an unusually high stabilization index) which allows the utilization of higher bitumen content (to achieve advantageous thicker film thicknesses in the pavement without suffering an increase in rutting or a loss of skid resistance); but similar fillers for Refinery Asphalt have never been available for petroleum (refinery) asphalt even in spite of a years-long quest involving widespread commercial research toward that very goal, in at least the United States, Great Britain, and Germany.

The more adhesive nature of Trinidad Asphalt allows one to utilize lower bitumen content, and employ more open mix designs having less of the small particle aggregate which makes skid resistance objectionably lowered.

These illustrate that many things known or believed or recommended in the art of petroleum (refinery) asphalt, are very often not known with respect to Trinidad Lake Asphalt, or not known how to convert or adapt one knowledge to the other. In many respects, often very significant respects, the concepts and the art involving Trinidad Lake Asphalt is indeed quite different from that of petroleum or refinery asphalt.

Thus, the refinery or petroleum asphalt of The Asphalt Handbook must in many respects be realistically considered to be a substantially different material, a different art, a different technology, from the Trinidad asphalt concrete art in which the present invention is a significant improvement.

This is not to assert a fault of The Asphalt Handbook, but merely to realistically show that it is concerned with a distinctly different art. The Asphalt Handbook, in relating to petroleum asphalt, tells the technologist how to employ asphaltic materials with given physical characteristics, in the production of pavements having given physical characteristics, but only as the pavement is applied at the time of the paving process. However, The Asphalt Handbook does not enter into the more sophisticated differences between asphalts with respect to their effect on the very important long term behavior characteristics of the pavements. The present invention is not based on The Asphalt Handbook but upon the inventor's new knowledge acquired by the inventor's 5-year study published by him in April 1977, in *Highway & Heavy Construction* and and his new data with respect to cracking.

Further, there is a great lack of predictability as to the endurance or durability factors, such as the objectionable factors of cracking, potholing, and chuckholing which are successfully overcome by applicant's invention in spite of all sorts of compositions and percentages of prior art attempts.

For example, currently, even the FHWA does apparently not know how to predict pothole resistance in pavements, and neither does the National Research Council.* And, as everyone knows, neither has the many years of prior art attempts.

* More specifically, the Transportation Research Board of the National Research Council.

And in spite of the lack of knowledge as to this important long-term performance factor, by all the prior art and by The Asphalt Handbook, and even the FHWA and the National Research Council, who are generally recognized as the highest sources of technical know-how, the particulars of the present invention have never been attained by any of all this prior art.

And even this inventor's, belief, that the long-term pothole resistance is at least very significantly and perhaps even primarily a function of the long-term flexibility of the pavement, has not itself been recognized by these high prior art sources; so no assertion of obviousness can be realistically asserted from prior art sources which do not attain that long-term flexibility.

Further, when also is realistically considered distinctions between the two technologies (Refinery or petroleum asphalt, which is all The Asphalt Handbook is concerned with, vs. Trinidad asphaltic concrete), and with the difficulties illustrated above as to non-predictability of wearability quality from any particular set of mixture ingredients, The Asphalt Handbook is not fairly or logically assertable either as an anticipation or as in any hindsight grouping with the other references.

That is, in other words, not only do the various references (other than The Asphalt Handbook) not specify the particulars of any of the present invention's concepts, but thus there can be no fair or realistic assertion of obviousness of utilizing any particular set or proportion of ingredients from either The Asphalt Handbook or the other references.

4. Csanyi (U.S. Pat. No. 2,917,395 (1959))

This is a 1959 patent, in which asphalt is emulsified with steam, providing apparently an improved mixing process; and although it is of the relatively present era (considering the era since the 1940's as "present" in this regard in view of a general trend then toward a consideration of achieving more structural strength, etc.), and although it shows a conscious consideration of a variety of aggregate mixtures, nevertheless it does not show the specific aggregate mixtures specified as to this invention's embodiments, nor mention any concept of any asphalt cement in which Trinidad Asphalt is used, nor indeed any mention of any use whatever of Trinidad Lake Asphalt.

Accordingly, this Csanyi patent shows not only that it does not anticipate these inventive concepts, but helps to show that neither it nor the other references render this invention obvious. Instead, it illustrates the struggles and the failures of the prior art, to attain this invention's particulars and this invention's achievements.

The achievement provided by the present invention, with Trinidad Lake Asphalt as a basic ingredient which Csanyi does not ever mention, further shows inventiveness of the distinctions and differences over Csanyi and over any hindsight grouping of references including Csanyi.

5. Pine (U.S. Pat. No. 1,057,667 (1913))

This is an early patent, which incidentally helps patentability by illustrating the fact that Trinidad Lake Asphalt was already known and used even then, more than 60 years ago.

This Pine patent involves the pulverizing of Trinidad Lake Asphalt, and its water-washing or other treatment to prevent its re-agglomeration, and also involves a comminuting procedure and other treatments, for hoped betterment of quality. However, there is set forth in Pine no indication whatever of the proportion of Trinidad Lake Asphalt used; and Pine gives no suggestion of the other particulars of this invention's concepts. Further, Pine offers no reason or motive as to any hindsight modification of Pine's disclosure.

In contrast to the present invention, Pine was asserting a preparation of the component Trinidad Lake Asphalt, rather than an overall Trinidad asphalt cement pavement; and thus Pine's disclosure should not be magnified to assert obviousness of the particular concepts of the present invention.

More particularly, the pavement described by Pine in his process patent is much higher in asphalt content than as the present invention, and is substantially different in aggregate composition from the present invention.

Pine's is a sheet asphalt; and the differences between sheet asphalt and asphaltic concrete are further reasons why the concepts of the present invention are seen to be inventively different from any use or hindsight modification of Pine.

A further difference is that the oil employed by Pine was 14°–20° Baumé (0.97–0.92 SG) (23.5–14.5 API). Such oil would have to be classed as a fuel oil, and apparently was a residuum of that era's atmospheric distillation process for crude oil. The present invention, in contrast, does not use fuel oil, and it would probably have a bad effect in applicant's invention; and thus, Pine's use of it as an apparently necessary factor helps to show that his disclosure should not be asserted against the present invention.

These several reasons show that Pine should not be asserted singly or in any hindsight grouping of references; for the present invention differs in these significant respects from Pine.

6. Rogers (U.S. Pat. No. 3,274,016 (1966))

This patent relates to a process involving an extended heating-treating or "curing" step, for acquiring a hardness of a formed object such as a building block which would be quite undesirable from the standpoint of an asphaltic concrete of the present invention. Rogers uses this curing at a high (300°–500° F.) temperature, for many hours, specifically to achieve a fast oxidation, to harden the object, all of which is undesirable to the present invention.

The Rogers' composition also requires and needs a high clay and silt content, this also being quite in contrast to the present invention, or to what the present invention desires. Neither of those ingredients would be desired for the asphaltic concrete of the present invention; and the contrast of these ingredients, as of utility for Rogers' formed building blocks but being undesired for an asphaltic concrete, emphasizes the distinction between the field of arts, of Rogers on the one hand and this invention on the other hand.

Further, this Rogers patent indicates no suggestion of this invention's use of a blend of Trinidad Lake Asphalt with refinery asphalt, but expressly contemplates solely one or the other of various types of asphalts, and with no preference at all as to Trinidad Lake Asphalt over those other asphalts which Rogers mentions in addition to refinery asphalt and Trinidad Lake Asphalt.

7. Rogers (U.S. Pat. No. 3,287,146 (1966))

This Rogers patent seems quite distinct from the present invention, in respects already noted as to Rogers' earlier patent. Thus this Rogers patent seems to require no further comment here.

8. Gagle (U.S. Pat. No. 3,902,914)

This patent mentions Trinidad Lake Asphalt but in a binder composition including petroleum shale, a mixture not to be desired in an asphaltic concrete. Further, the entire size of mineral content used by Gagle is as small or smaller than the smallest mineral particles of the composition of the present invention.

Moreover, Gagle does not suggest any combination of Trinidad Lake Asphalt and petroleum asphalt, which is a characteristic of all embodiments of the present invention.

9. Warden (U.S. Pat. No. 2,171,153)

Clay is asserted as an essential ingredient, assertedly to attain deliquescence, in what Warden desires as a sub-surface use; but the Warden composition cannot be considered to be an asphaltic concrete, and the Warden patent shows no suggestion of Trinidad Lake Asphalt used in combination with refinery or petroleum asphalt, such as characterize all embodiments of the present invention.

This Warden patent, and an article in a 1939 publication of the Proceedings of Association of Asphalt Paving Technologists, both some 40 years ago, were the last publications in this country which dealt with Trinidad Lake Asphalt as a pavement constituent, except other patents cited herein which merely mention it as a theoretically possible alternate for uses always other than an asphaltic concrete product as per this present invention.

In addition to the specific patentability factors already mentioned, it may be helpful to point out that the non-obviousness of the present invention is further shown as follows, for it shows that the particulars of the present invention are a departure from the prior art.

That is, it is pointed out that currently the dominant road building technology in the United States has been derived from the AASHTO studies and equation of 1962. Conceptually, the equation says "Barring major rutting, both the performance and life of a road are determined by its levelness." Just the single factor of levelness; that is the sole significant determinant, according to that equation. The said AASHTO study lacked being a measure to total long-term performance of the pavement, because it did not measure the motorists' experience with poor pavement behaviors, such as chuckholes or potholes. It lacked being a valid measure of actual pavement life, because it has been found to not take into consideration these very significant long-term factors of actual pavement life.

But, imperfect as the inventor considers the AASHTO study and equation to be, their very widespread recognition and respectability also show that the particulars of the present invention cannot logically or properly be asserted to be obvious, for they relate to factors of the composition which the AASHTO study and equation assert to be not important.

This reason further shows patentability, adding to the reasons set forth against the particular references cited; for it shows a departure not only from those references but from this other highly-recognized authority.

The embodiment preferred by the inventor is a hot mix (over 212° F.) as follows:

| Ingredient: | Weight % |
|---|---|
| Petroleum asphalt, paving grade, 200–250 penetration | 4.5 |
| Trinidad Lake Asphalt | 1.6 |
| Filler (passing 200 mesh) | 3.0 |
| Aggregate (Type II) | 90.9 |

However, applicant's preference for this particular embodiment is based on his more specific familiarity with it and with its paveability and wear-life, rather than some assertion that it is scientifically to be preferred over other embodiments of the disclosed ranges.

Thus, the invention indicates this as his "preference" in contrast to asserting that it is better than others of the ranges set forth.

Other factors are quite conventional and thus there seems no need for them to be specified. That is, the aggregate and filler is mixed in a conventional pugmill, and the mix is thorough. The blend of Trinidad Lake Asphalt and refinery or petroleum asphalt is mixed separately; then the blend of asphalts is stored in an agitated and heated tank. Then the asphalt blend is added to the pugmill and now the total mixture is thoroughly mixed. Finally, by conventional equipment, the asphaltic concrete is transported and used; that is, it is hauled to the job site by conventional dump trucks, paved with a conventional paver, and rolled with a conventional roller. It can be satisfactorily paved as thin as the size of the aggregate will permit. It is the claimed mixture, not these conventional procedures, which is the invention and provides the highly advantageous asphaltic concrete.

SUMMARY

It is thus seen that asphaltic compositions according to concepts of the present invention, provide novel and advantageous concepts and features, providing not only asphaltic compositions which are more ductile, with a consequent lessening of objectionable hardening through the years, but they provide those advantages without sacrifice of other desired qualities, and by the use of known and available asphalt ingredients, and by known and available aggregate mixtures.

Accordingly, it will thus be seen from the foregoing description of the invention according to these illustrative embodiments, that the concepts of the present invention provide new and useful asphalt compositions which achieve desirable goals, and which have desired advantages and characteristics, and which accomplish their intended objects, including those hereinbefore pointed out and others which are inherent in the invention.

Modifications and variations may be effected without departing from the scope of the novel concepts of the invention.

What is claimed is:

1. An asphaltic concrete, comprising a blended Trinidad asphalt cement, formed from 10% to 50% Trinidad asphalt and 50% to 90% refinery asphalt, said percentages being by weight of the resulting blended Trinidad asphalt cement, in combination with an aggregate mixture selected from one of the following, the total mixture being prepared at a temperature above 212° F., and the blended Trinidad asphalt cement being used in a weight percentage of from 4.0% to 8.0% of the pavement mixture:

| Aggregate Sieve Size (Passing) | Type I | Type II |
| --- | --- | --- |
| Passing ¾" | 100 | |
| Passing ½" | 98–100 | 100 |
| Passing ⅜" | | 98–100 |
| No. 8 (Retained on) | 40–60 | 30–50 |
| Passing 200 mesh | 3–8 | 3–9. |

2. The invention as set forth in claim 1 in a combination in which the blended Trinidad asphalt cement is formed from 25% to 30% refined Trinidad asphalt and 70% to 75% refinery asphalt.

3. The invention as set forth in claim 1 in a combination in which the blended Trinidad asphalt cement is used in a weight percentage of from 6.0% to 7.5% of the pavement mixture.

4. The invention as set forth in claim 1 in a combination in which the blended Trinidad asphalt cement is used in a weight percentage of from 4.5% to 8.0% of the pavement mixture.

5. The invention as set forth in claim 1 in a combination in which the penetrations of the asphalt cement are from 85 to 100.

6. The invention as set forth in claim 1 in a combination in which the penetrations of the asphalt cement are from 20 to 150 as measured at 77° F.

7. An asphaltic concrete, comprising a blended Trinidad asphalt cement, formed from 10% to 50% Trinidad asphalt and 50% to 90% refinery asphalt, said percentages being by weight of the resulting blended Trinidad asphalt cement, in combination with an aggregate mixture selected from one of the following, the total mixture being prepared at a temperature above 212° F., and the blended Trinidad asphalt cement being used in a weight percentage of from 4.0% to 8.0% of the pavement mixture:

| Aggregate Sieve Size | Type III | Type IV |
| --- | --- | --- |
| Passing ¾" | 100 | |
| Passing ½" | 79–90 | 100 |
| Passing ⅜" | 55–80 | 80–97 |
| No. 8 (Retained on) | 30–45 | 36–48 |
| Passing 200 mesh | 0–3 | 0–3 |

8. The invention as set forth in claim 7 in a combination in which the blended Trinidad asphalt cement is formed from 25% to 30% refined Trinidad asphalt and 70% to 75% refinery asphalt.

9. The invention as set forth in claim 7 in a combination in which the blended Trinidad asphalt cement is used, in a weight percentage of the pavement mixture, 5.5% to 7.0% for Type III, and 6.0% to 7.0% for Type IV.

10. The invention as set forth in claim 7 in a combination in which the blended Trinidad asphalt cement is used, in a weight percentage of the pavement mixture, 4.5% to 8.0%.

11. The invention as set forth in claim 7 in a combination in which the penetrations of the asphalt cement are from 55 to 85.

12. The invention as set forth in claim 7 in a combination in which the penetrations of the asphalt cement are from 20 to 150 as measured at 77° F.

13. An asphaltic concrete, comprising a blended Trinidad asphalt cement, formed from 10% to 50% Trinidad asphalt and 50% to 90% refinery asphalt, said percentages being by weight of the resulting blended Trinidad asphalt cement, in combination with an aggregate mixture selected from one of the following, the total mixture being prepared at a temperature above 212° F., and the blended Trinidad asphalt cement being used in a weight percentage of from 4.0% to 8.0% of the pavement mixture:

| Aggregate Sieve Size (Passing) | Type V (Fine) | Type VI (Course) |
| --- | --- | --- |
| Passing 1" | | 95–100 |
| Passing ¾" | 100 | |
| Passing ½" | 90–100 | 25–60 |

| Aggregate Sieve Size (Passing) | Type V (Fine) | Type VI (Course) |
|---|---|---|
| Passing ⅜" | 40–70 | |
| No. 8 (Retained on) | 0–5 | 0–5 |
| Passing 200 mesh | 0–8 | 0–8 |

14. The invention as set forth in claim 13 in a combination in which the blended Trinidad asphalt cement is formed from 25% to 30% refined Trinidad asphalt and 70% to 75% refinery asphalt.

15. The invention as set forth in claim 13 in a combination in which the blended Trinidad asphalt cement is used in a weight percentage of from 4.5% to 8.0% of the pavement mixture.

16. The invention as set forth in claim 13 in a combination in which the blended Trinidad asphalt cement is used in a weight percentage of from 4.0% to 4.5% of the pavement mixture.

17. The invention as set forth in claim 13 in a combination in which the penetrations of the asphalt cement are from 20 to 150 as measured at 77° F.

* * * * *

UNITED STATES PATENT AND TRADEMARK OFFICE
CERTIFICATE OF CORRECTION

PATENT NO. : 4,274,882
DATED : June 23, 1981
INVENTOR(S) : LeRoy H. McAllister, Jr.

It is certified that error appears in the above—identified patent and that said Letters Patent is hereby corrected as shown below:

Col. 3, line 59: Change "Lee'" to "Lees' ".

Col. 5, line 64: Delete comma after word "inventor's".

Col. 7, line 28: The words "heating-treating" should be "heat-treating".

Signed and Sealed this

Twenty-fourth Day of August 1982

|SEAL|

Attest:

GERALD J. MOSSINGHOFF

Attesting Officer     Commissioner of Patents and Trademarks